Patented Aug. 21, 1923.

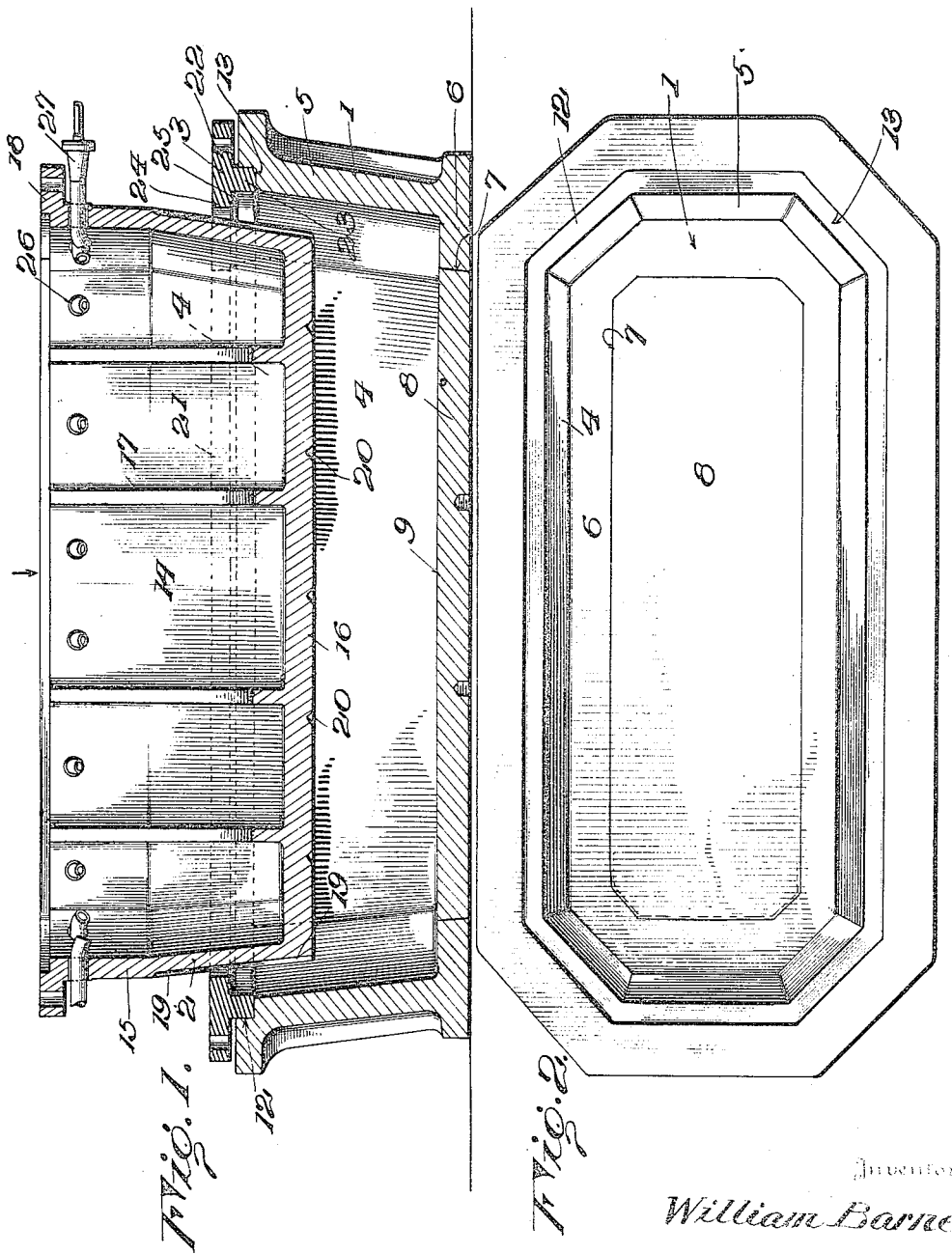

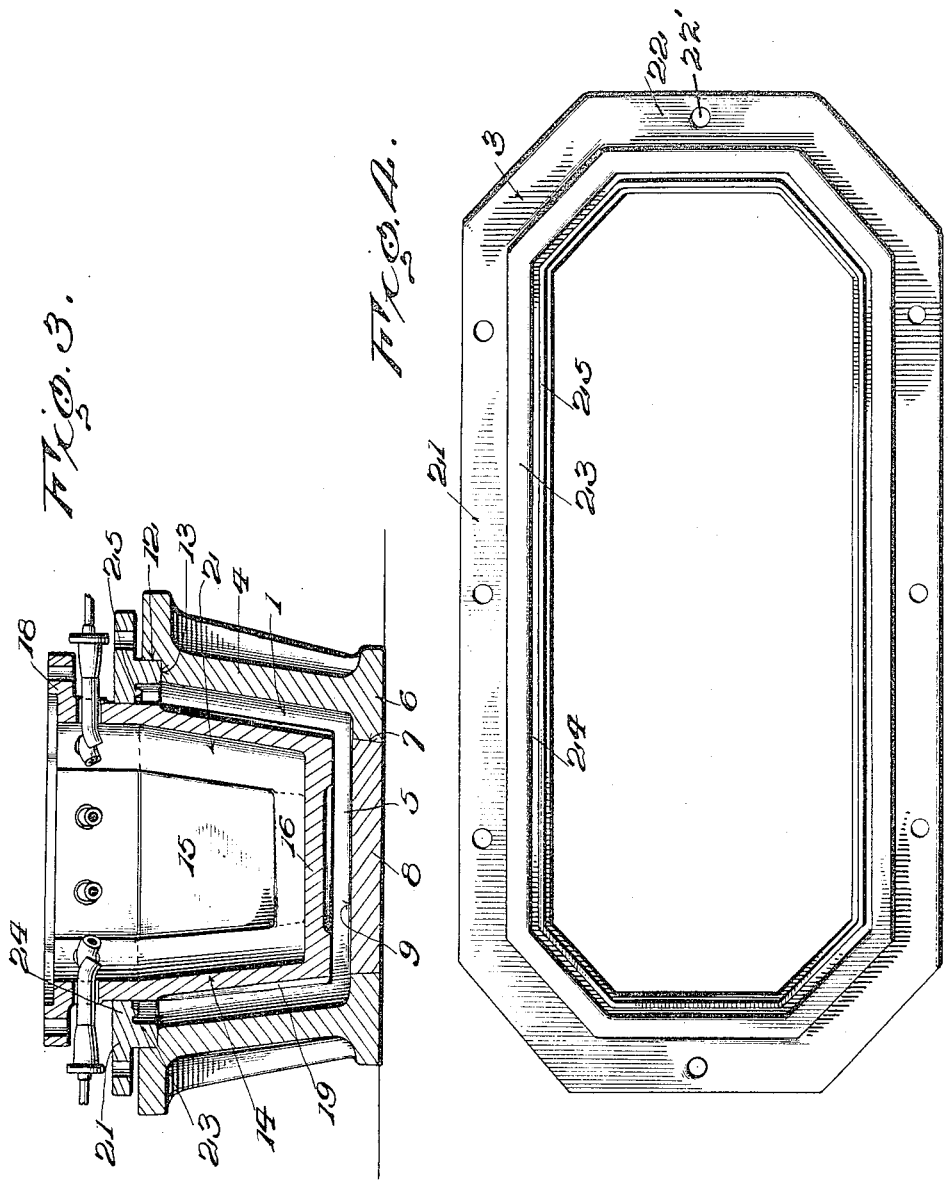

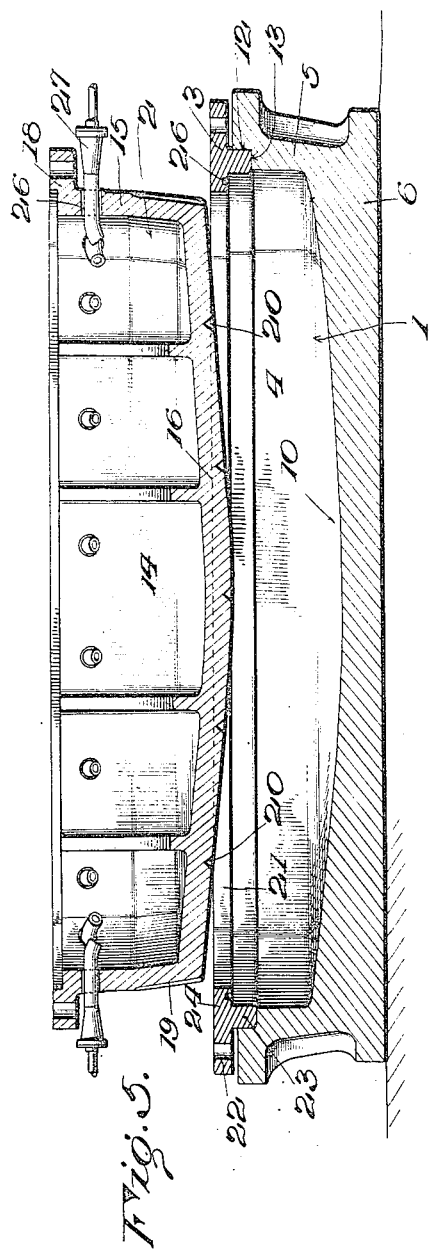
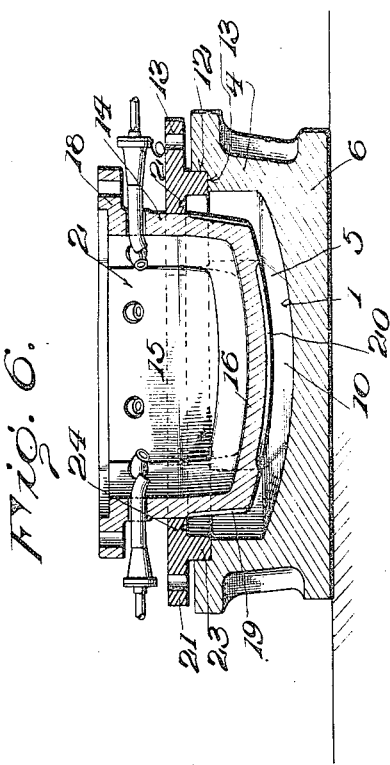

1,465,724

UNITED STATES PATENT OFFICE.

WILLIAM BARNES, OF ZANESVILLE, OHIO, ASSIGNOR TO JAMES W. DE CAMP, OF BLACKWELL, OKLAHOMA.

MOLD.

Application filed June 17, 1918. Serial No. 240,460.

*To all whom it may concern:*

Be it known that I, WILLIAM BARNES, a citizen of the United States, residing at Zanesville, in the county of Muskingum and State of Ohio, have invented certain new and useful Improvements in Molds, of which the following is a specification.

This invention relates to molds and more particularly to a mold designed for employment in the molding of glass caskets such as illustrated and described in Patent No. 1,211,684 issued to James W. De Camp, January 9, 1917. The casket above referred to comprises an integral or one piece body and an integral or one piece lid which is hingedly connected with the body, and the invention contemplates the provision of molds for the body and lid so constructed as to provide for the expeditious and accurate molding of the said parts comprising the casket.

One object of the present invention is to provide in a mold for the purpose stated, a mold chamber, a core designed to enter the said chamber in the molding operation with its sides and ends spaced from the side and end walls of the mold chamber so as to form the corresponding walls of the casket body or lid as the case may be, and a cap ring which closes the top of the said space during the molding operation and constitutes means for centering the mold finally in position and suitably molding the upper edges of the walls of the body and the lower edges of the walls of the lid, this ring serving also to prevent overflow of the molten glass from the mold chamber and serving further to cause equal distribution of the molten glass around the top of the space between the walls of the core and the walls of the mold chamber so that the edges of the walls of the body or lid of the casket will be evenly and smoothly formed.

Another object of the invention is to provide the mold chamber with means whereby the molded article may be readily ejected from the said chamber.

In the accompanying drawings:

Figure 1 is a vertical longitudinal sectional view through the mold for producing the body of the casket;

Figure 2 is a top plan view of the mold chamber shown in Figure 1;

Figure 3 is a vertical transverse sectional view through the mold;

Figure 4 is a bottom plan view of the cap ring of the mold;

Figure 5 is a view similar to Figure 1 illustrating the mold provided for molding the lid of the casket;

Figure 6 is a vertical transverse sectional view through the mold shown in Fig. 5.

With the exception of certain minor details of construction, form, and dimensions, the molds for the body and lid of the casket are identical and therefore a description of the mold for the body will suffice, the exceptions above referred to being, however, pointed out in the description which is to follow. Of course, corresponding parts in the two molds are indicated by like reference numerals.

As before stated, the mold embodying the present invention consists essentially of three parts, namely, the mold chamber, the core, and the cap ring or frame and these parts are indicated in general in the drawings by the numerals 1, 2 and 3 respectively. The mold chamber 1 comprises integral side walls 4 and end walls 5, the said chamber being open at its top and being provided in its bottom, which is indicated by the numeral 6, with an opening 7 of any appropriate shape and illustrated in Figure 2 of the drawings as substantially of oblong rectangular form. This opening 7 receives a movable bottom section which is indicated by the numeral 8, the opening 7 being preferably slightly tapered in a downward direction and the bottom section 8 being correspondingly formed so that the section will be supported within the opening 7 even though the mold chamber be lifted bodily from its supporting base while the said bottom section 8 occupies a position therein. In the mold for the body of the casket, the under side or face of the bottom section 8 is preferably flat and flush with the under face of the bottom 6 of the mold chamber so that when the mold chamber is resting upon a flat surface, which is the case in the actual use of the mold, the bottom section 8 will be afforded firm support. The upper face of the section 8, indicated by the numeral 9, is flat, but in the instance of the mold chamber for the formation of the lid of the casket, the upper surface of the bottom of said mold chamber is both longitudinally and transversely concave as indicated by the numeral 10, so as to produce a casket lid correspondingly formed, although this surface as well as the under surface of the core 2 may be of any other desired contour. The inner faces of the walls of the mold chamber 1 in the instance of both molds, are formed at their upper edges with a continuous rabbet 12 providing a shoulder 13 spaced below the plane of the upper edges of the said walls, and the purpose of thus forming the walls will be presently explained.

The core 2 of the mold has preferably an integral cast body which may be of solid or substantially hollow form and this body comprises a bottom 16 from which rise side and end walls flaring upward at their lower portions 14 and substantially vertical at their upper portions 15. Where the core is of hollow formation, it is preferable that reinforcing webs 17 be formed within the same so as to reinforce the bottom and sides and ends of the body. At their upper edges, the sides and ends of the body are formed exteriorly with an outwardly extending continuous flange 18, by means of which the body may be secured to the plunger of a mold press or any similar member through the medium of which downward pressure may be exerted against the core to force the same into the mass of molten glass contained within the mold chamber, during the molding operation. In the instance of each mold, the core 2 is exteriorly of a contour substantially the same as the interior contour of the respective mold chamber but of smaller dimensions so that when the plunger is centrally introduced into the mold chamber, the outer surfaces of the sides and ends and bottom of the core will be spaced a suitable distance from the corresponding sides, ends and bottom of the mold chamber, the distance between these parts corresponding substantially to the thickness of the walls of the casket body or lid to be produced. The body and lid of the casket are provided interiorly with reinforcing ribs of glass molded integrally with the side and end walls and the top or bottom as the case may be, and in order to provide for the formation of these ribs during the molding operation, the flaring lower portions 14 of the walls of the core are formed exteriorly with substantially vertically extending grooves 19 and the under side of the bottom 16, is formed with transversely extending grooves 20.

The cap ring 3 comprises sides 21 and ends 22, the said ring being in the nature of an approximately oblong rectangular frame, as clearly shown in Fig. 4 of the drawings. The upper side of the cap ring 3 is preferably flat and is suitably constructed to provide for its attachment to a member capable of movement to elevate and lower the said ring so that the ring may occupy a position upon the top of the mold chamber, as shown in the sectional views of the drawings, or may be lifted from such position. The sides and ends of the ring 3 are formed upon their under side with a continuous downwardly extending rib 23 of a height greater than the depth of the rabbet 12 and of a width slightly greater than the width of the shoulder 13, the inwardly and outwardly presented faces of the rib 23 occupying vertical planes. The rib 23 is spaced from the inner edge of the body of the ring 3 a distance substantially equal to the width of the space between the outer surface of the core and the inner faces of the walls of the mold chamber and the interior dimensions of the ring 3 are such that the core when lowered into position through the ring will more or less snugly fit at its upper portion within the said ring. Due to the position of the rib 23, the inner portion of the body of the ring 3 constitutes an overhanging flange 24 which is designed to close the top of the said space and which in the instance of the ring constituting a part of the mold for the body, is formed upon its under face with a depending continuous relatively narrow tongue 25 and in the instance of the ring for the lid mold is formed with a continuous relatively narrow groove 26.

From the foregoing description of the invention it will be understood that after a proper quantity of molten glass has been introduced into the mold chamber and the cap ring is in proper position upon the top of the mold chamber, the core will be forced down through the ring and into the chamber. As its lower end encounters and sinks into the mass of molten glass, the latter will rise between the core and the wall of the mold, the space between the inner edge of the flange 24 and the tapering portion 14 of the core permitting the escape of air. As the core reaches its final and proper position, it is accurately centered within the chamber by the close fit of the upright portion 15 of its wall against the inner edge of the flange 24. Just at this time under ordinary circumstances the level of the molten glass reaches the under side of the overhanging flange 24 of the cap ring 3, which ring will serve to smoothly and accurately form the upper edges of the walls of the body of the casket or the lower edges of the walls of the lid as the case may be. After the glass has sufficiently hardened and the core and cap ring have been withdrawn, the molded article may be, of course, readily ejected from the mold chamber by elevating the bottom section 8 of the said chamber.

As it is desirable if not essential that the core be heated preparatory to carrying out of the molding operation, the walls of said core are provided near their upper edges with openings 26 through which may be inserted suitable burners 27 for the purpose stated.

As before stated, the rib 23 is of a thickness slightly greater than the width of the shoulder 13 so that the inner face of the rib occupies a plane spaced inwardly from the plane of the inner face of the respective wall of the mold chamber. Therefore, when the casket body or lid is molded it will be provided exteriorly with a shallow rabbet extending continuously around the upper edge of the body of the casket and the lower edge of the lid of the casket, these rabbets being designed to receive binding bands or straps as set forth in the patent before mentioned.

As before stated, the cap ring 3 is suitably constructed to provide for its attachment to a member capable of movement to elevate and lower the said ring so that the ring may occupy a position upon the top of the mold chamber, as shown in the sectional views of the drawings, or may be upwardly displaced from such position, and to this end the said ring may be provided with bolt openings as shown particularly in Fig. 4 of the drawings for the passage of suitable securing bolts, (not shown).

Having thus described the invention, what is claimed as new is:

1. In a mold of the class described, the combination with a mold chamber having an open top and a continuous rabbet formed in its inner wall at said open top, the bottom of the mold chamber being provided with a vertically movable section, the walls of which are undercut to normally hold said section in operative position with the upper face of the section flush with the inner face of the bottom of the mold chamber, of a integral cap ring whose body overlies the inner wall of the mold chamber, said ring having a depending rib filling said rabbet and projecting inwardly beyond the inner wall of the mold chamber to form a shoulder producing an exterior peripheral band receiving depression on the molded product, and said ring being further provided with an inwardly projecting flange, and a hollow core movable through the cap ring to operative position within the mold chamber.

2. The combination with a mold chamber, of a cap ring resting on the top of the mold chamber and having a flange projecting inwardly within said mold chamber, a hollow core movable through the cap ring to operative position within the mold chamber with the exterior walls of the core bearing against the flange of the cap ring, reinforcing webs extending inwardly from the bottom and side walls of the core and terminating short of the center of said core to permit the circulation of air through the center of the core, and heating devices projecting through the walls of the core between the reinforcing webs, the ends of the heating devices terminating short of the inner edges of said reinforcing webs.

In testimony whereof I affix my signature.

WILLIAM BARNES. [L. S.]